United States Patent
Yamane

(10) Patent No.: US 12,411,059 B2
(45) Date of Patent: Sep. 9, 2025

(54) METHOD OF MANUFACTURING TEST TIRE AND METHOD OF SETTING TREAD REMOVAL SHAPE

(71) Applicant: BRIDGESTONE CORPORATION, Tokyo (JP)

(72) Inventor: Eiichiro Yamane, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 815 days.

(21) Appl. No.: 17/754,562

(22) PCT Filed: Jul. 9, 2020

(86) PCT No.: PCT/JP2020/026934
§ 371 (c)(1),
(2) Date: Apr. 6, 2022

(87) PCT Pub. No.: WO2021/075098
PCT Pub. Date: Apr. 22, 2021

(65) Prior Publication Data
US 2023/0091335 A1    Mar. 23, 2023

(30) Foreign Application Priority Data
Oct. 16, 2019   (JP) ................. 2019-189749

(51) Int. Cl.
*G01M 17/02* (2006.01)
*B60C 11/24* (2006.01)
*B60C 19/00* (2006.01)

(52) U.S. Cl.
CPC ............. *G01M 17/02* (2013.01); *B60C 19/00* (2013.01); *B60C 11/246* (2013.01)

(58) Field of Classification Search
CPC ....... B60C 11/246; B60C 19/00; G01M 17/02
See application file for complete search history.

(56) References Cited

FOREIGN PATENT DOCUMENTS

| CN | 215035981 U | * | 12/2021 | |
|---|---|---|---|---|
| DE | 3005543 C2 | * | 9/1989 | ............... B60C 9/18 |
| FR | 3038546 A1 | * | 1/2017 | ........... B60C 9/2006 |

(Continued)

OTHER PUBLICATIONS

Foreign Reference.*

(Continued)

*Primary Examiner* — Jill E Culler
(74) *Attorney, Agent, or Firm* — KENJA IP LAW PC

(57) ABSTRACT

A method of manufacturing a test tire and a method of setting a tread removal shape include, moving an outline of a tread surface to set a remaining groove outline, setting a point B at the intersection of a line segment extending radially from a point A, on the tread surface at a position corresponding to 70% to 80% of the tread width, and the remaining groove outline, setting the remaining groove outline farther inward than point B as a first removal reference line, setting a line passing through point B and a point L, where a straight line yielded by a tangent to the tread surface at point A being translated to point B as a second removal reference line, and removing a portion of the tread, with reference to a tread removal shape defined by the first removal reference line and the second removal reference line.

8 Claims, 3 Drawing Sheets

(56) References Cited

FOREIGN PATENT DOCUMENTS

| | | |
|---|---|---|
| JP | H09132013 A | 5/1997 |
| JP | H1159131 A | 3/1999 |
| JP | H1159142 A | 3/1999 |
| JP | H1159143 A | 3/1999 |
| JP | 2005193770 A | 7/2005 |
| JP | 2010133796 A | 6/2010 |
| JP | 2010162997 A | 7/2010 |
| JP | 2012181104 A | 9/2012 |
| JP | 2013088309 A | 5/2013 |

OTHER PUBLICATIONS

ASTM International, Standard Guide for Preparing Artificially Worn Passenger and Light Truck Tires for Testing, 2015, ASTM F1046-01 (Reapproved 2015).

Sep. 24, 2020, International Search Report issued in the International Patent Application No. PCT/JP2020/026934.

Sep. 14, 2023, search result of the Extended European Search Report issued by the European Patent Office in the corresponding European Patent Application No. 20876148.6.

Apr. 19, 2022, International Preliminary Report on Patentability issued in the International Patent Application No. PCT/JP2020/026934.

\* cited by examiner

METHOD OF MANUFACTURING TEST TIRE AND METHOD OF SETTING TREAD REMOVAL SHAPE

TECHNICAL FIELD

The present disclosure relates to a method of manufacturing a test tire and a method of setting a tread removal shape.

BACKGROUND

Automobile tires, such as passenger car radial tires and light truck tires, have grooves on the tread surface for the purpose of improving drainage performance on wet road surfaces. The American Automobile Association (AAA) and various other organizations have reported that the performance of such tires with grooves changes significantly due to wear, especially at the end of wear, and recommend early tire replacement.

On the other hand, since tires with less performance degradation due to wear are useful for users, tire manufacturers and others have been developing technologies to suppress changes in performance due to wear.

In the development, for example, of the aforementioned technologies, various tests are conducted using test tires that reproduce the worn state, such as braking tests on wet road surfaces, with the aim of measuring performance at the time of wear. Methods for easily preparing test tires that reproduce the worn state have therefore been proposed.

For example, as an alternative to inducing wear in the tread of a tire by driving on actual roads, non-patent literature (NPL) 1 describes a procedure for manufacturing a test tire that reproduces the worn state by cutting or grinding the tread surface of an unused tire (new tire), so that the outline of the tread surface is the same before and after removal, and making the depth of grooves on the tread surface shallower.

CITATION LIST

Non-Patent Literature

NPL 1: Standard Guide for Preparing Artificially Worn Passenger and Light Truck Tires for Testing, ASTM F1046-01, USA, 2015

SUMMARY

Technical Problem

In the method described in PTL 1, the tread surface of a new tire is cut or ground so that the outline of the tread surface is the same before and after removal, but the shape of the tread upon removal is only roughly specified.

It is therefore difficult to apply the aforementioned method to a wide range of tire sizes. Depending on the tire size, the manufactured test tire may not sufficiently reproduce the worn state, and a performance test using the test tire may not sufficiently reproduce the performance of the tire in the worn state.

Another problem is that, depending on the tire size, the rubber in the shoulder portion might be excessively removed, exposing internal structures such as the belt.

Demand thus exists for clearly specifying the cross-sectional shape of the tread to be removed by cutting or grinding when manufacturing a test tire, so as to improve the reproducibility of the tire performance in the worn state by a performance test using the test tire.

The present disclosure aims to provide a method for manufacturing a test tire and a method for setting a tread removal shape that enable the simple manufacturing of test tires that reproduce the worn state well.

Solution to Problem

A summary of the present disclosure is as follows.

A method of manufacturing a test tire according to the present disclosure is a method of manufacturing a test tire that reproduces a worn state by removal of a portion of a tread of a tire including a groove on a tread surface, the method including:

in a cross-sectional view perpendicular to a circumferential direction of the tire when the tire is mounted on an applicable rim and filled to a prescribed internal pressure, moving an outline of the tread surface inward in a radial direction to a position at which the groove has a predetermined depth to set a remaining groove outline;

setting a point A on the tread surface at a position corresponding to 70% to 80% of a tread width and setting a point B at an intersection of a line segment extending from the point A in the radial direction of the tire with the remaining groove outline; setting a portion of the remaining groove outline that is farther inward in a tire width direction than the point B as a first removal reference line;

setting a point at which a straight line, yielded by a tangent to the tread surface at the point A being translated to the point B, intersects an outer surface of the tire outward in the tire width direction as a point L;

setting a line passing through the point B and the point L as a second removal reference line; and removing a portion of the tread, with reference to a tread removal shape defined by the first removal reference line and the second removal reference line, to manufacture the test tire.

A method of setting a tread removal shape according to the present disclosure is a method of setting a tread removal shape serving as a reference for removing a tread when manufacturing a test tire that reproduces a worn state by removal of a portion of the tread of a tire that includes a groove on a tread surface, the method including:

in a cross-sectional view perpendicular to a circumferential direction of the tire when the tire is mounted on an applicable rim and filled to a prescribed internal pressure, moving an outline of the tread surface inward in a radial direction to a position at which the groove has a predetermined depth to set a remaining groove outline;

setting a point A on the tread surface at a position corresponding to 70% to 80% of a tread width and setting a point B at an intersection of a line segment extending from the point A in the radial direction of the tire with the remaining groove outline; setting a portion of the remaining groove outline that is farther inward in a tire width direction than the point B as a first removal reference line;

setting a point at which a straight line, yielded by a tangent to the tread surface at the point A being translated to the point B, intersects an outer surface of the tire outward in the tire width direction as a point L;

setting a line passing through the point B and the point L as a second removal reference line; and setting a shape defined by the first removal reference line and the second removal reference line as the tread removal shape.

The aforementioned "tread surface" refers, in particular in the case of a pneumatic tire, to the peripheral surface, over the entire circumference of the tire, which comes into contact with a road surface when the tire is mounted on an applicable rim, filled to a prescribed internal pressure, and turned while having a load corresponding to the maximum load capability applied thereto. The "tread width" refers the width of the "tread surface" in the tire width direction.

The aforementioned "applicable rim" refers to a standard rim of an applicable size, such as the Measuring Rim in the STANDARDS MANUAL of the European Tyre and Rim Technological Organisation (ETRTO) in Europe or the Design Rim in the YEAR BOOK of the Tire and Rim Association, Inc. (TRA) in the USA, that is described, or will be described in the future, in industrial standards effective in the region where the tire is manufactured and used, such as the YEAR BOOK published by the Japan Automobile Tyre Manufacturers Association (JATMA) in Japan, the STANDARDS MANUAL of the ETRTO, and the YEAR BOOK of the TRA. (In other words, the "applicable rim" encompasses not only current sizes but also sizes that may be included in industrial standards in the future. An example of the "size that will be described in the future" is the size listed as the ETRTO Experimental Standard). In the case of a size not specified in the aforementioned industrial standards, the "rim" refers to a rim whose width corresponds to the bead width of the tire.

The "prescribed internal pressure" represents the air pressure (maximum air pressure) corresponding to the maximum load capability of a single wheel in an applicable size/ply rating described by the aforementioned JATMA or the like. In the case of a size not listed in the industrial standards, the "prescribed internal pressure" refers to the air pressure (maximum air pressure) corresponding to the maximum load capability prescribed for each vehicle on which the tire is mounted.

The "tread width" may be the tread width defined in ETRTO EDI Page PC7, 1.2.2 Reference tread width.

Advantageous Effect

According to the present disclosure, it is possible to provide a method for manufacturing a test tire and a method for setting a tread removal shape that enable the simple manufacturing of test tires that reproduce the worn state well.

DETAILED DESCRIPTION

Embodiments of the present disclosure are described below in detail with reference to the drawings.

A method according to the present disclosure is a method of manufacturing a test tire that reproduces a worn state by removal of a portion of the tread of a tire including grooves on the tread surface. In this method, the cross-sectional shape of the tread to be removed by cutting or grinding, i.e., the tread removal shape, is set, and a test tire is manufactured by removing a portion of the tread with reference to the tread removal shape.

The test tire manufactured in the present embodiment is a reproduction of the state after an unused tire (a new tire) has worn due to use, so that the grooves on the tread surface have become shallow. By conducting performance tests using this test tire, the tire performance of the aforementioned unused tire in a worn state can be obtained.

This test tire can be used for various tests, such as braking tests on wet road surfaces. The depth of the grooves remaining on the tread surface of the test tire can be changed in various ways depending on the type of test, the test conditions, and the like.

An example configuration of the unused tire that serves as the basis for the test tire is first described below.

Figure 1:
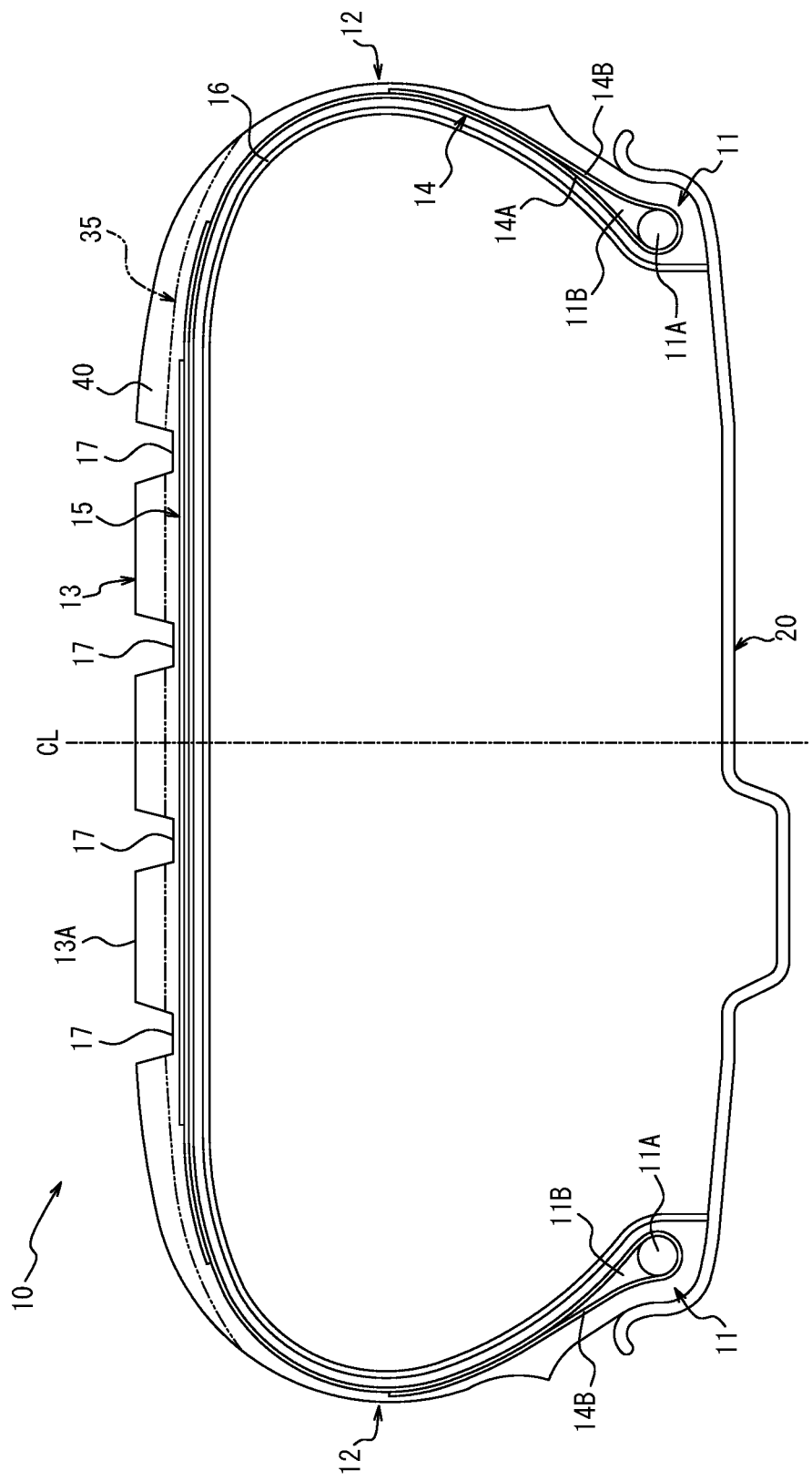
FIG. 1 is a cross-sectional view, perpendicular to the tire circumference, of a tire including grooves in the tread surface.

An unused tire 10 illustrated in FIG. 1 includes a pair of beads 11, a pair of sidewalls 12 respectively connected to the corresponding beads 11, and a tread 13 connected between the sidewalls 12.

In this example, the beads 11 include a bead core 11A and a bead filler 11B. The bead core 11A in this example includes a plurality of bead wires that are covered by rubber. The bead wires are formed by steel cords in this example. The bead filler 11B is formed from rubber or the like and is positioned farther outward in the tire radial direction than the bead core 11A. In this example, the bead filler 11B has a substantially triangular cross-sectional shape whose thickness decreases outward in the tire radial direction.

The tire 10 can, however, be structured without the bead cores 11A or the bead fillers 11B.

The tire 10 includes a carcass 14 toroidally extending between the pair of beads 11. The end sides of the carcass 14 are engaged with the bead cores 11A. Specifically, the carcass 14 has a carcass body portion 14A disposed between the pair of bead cores 11A and carcass folded-up portions 14B that are folded up from the tire widthwise inner side towards the tire widthwise outer side around the bead cores 11A. The extension length of the carcass folded-up portions 14B from the tire widthwise inner side to the tire widthwise outer side can be set appropriately.

The carcass 14 can have a structure without the carcass folded-up portions 14B, or a structure in which the carcass folded-up portions 14B are wrapped around the bead cores 11A.

The carcass 14 can be configured by one or more carcass plies. For example, the carcass 14 can be configured by a plurality of carcass layers stacked in the tire radial direction at the tire equatorial plane CL. In the present embodiment, the carcass 14 has a radial structure, but this example is not limiting. The carcass can also have a bias structure.

A belt 15 is provided on the tire radial outer side of a crown portion of the carcass 14. The belt 15 can, for example, be configured by a plurality of belt layers stacked in the tire radial direction. The number of belt layers, the inclination angle of the belt cords, the width of each belt layer in the tire width direction, and the like in the tire 10 are not particularly limited and can be set appropriately.

The tire 10 includes an inner liner 16. The inner liner 16 is disposed to cover the inner surface of the tire 10. The inner liner 16 can be configured by one or more inner liner layers stacked in the tire radial direction at the tire equatorial plane CL. The inner liner 16 is, for example, configured by a butyl-based rubber having low air permeability. Examples of butyl-based rubber include butyl rubber and butyl halide rubber, which is a derivative thereof.

The inner liner 16 is not limited to butyl-based rubber and can be configured by other rubber compositions, resins, or elastomers.

The sidewall 12 and tread 13 are each formed mainly from rubber.

A plurality of grooves 17 is provided on the surface of the tread 13, i.e., the tread surface 13A. In this example, the grooves 17 are each configured as a circumferential groove extending along the tire circumferential direction and opening at the tread surface 13A, but the extending direction of the grooves 17, the number of grooves 17, and the like are not particularly limited and can be set appropriately.

In this example, the depths of the plurality of grooves 17 (the distance from the tread surface 13A to the bottom farthest inward in the tire radial direction) are equal to each other, but two or more grooves 17 with different depths may be provided. The cross-sectional shape of the grooves 17 is not particularly limited and may be any of various shapes.

The tire 10 is configured as a pneumatic tire that is used after being filled with air, but the tire 10 is not limited to being filled with air. For example, the tire 10 can be used after being filled with another gas, such as nitrogen. The tire 10 is not limited to gas and may be used after being filled with any fluid, including a liquid, a gel-like substance, or a granular material.

The tire 10 is preferably a passenger car radial tire or a light truck tire but may be a tire other than these. In this example, the tire 10 is a passenger car radial tire.

Next, the procedures of the method of manufacturing a test tire according to the present embodiment, in which a portion of the tread 13 of the tire 10 is removed to manufacture a test tire that reproduces the worn state, are described.

In this method, first, a tread removal shape serving as a reference for removing a portion of the tread 13 of the tire 10 is set using the method of setting a tread removal shape according to the present embodiment. The tread removal shape is the target shape of the tread 13 after a portion of the tread 13 is removed by cutting or grinding.

The tread removal shape can be set by the following procedures.

The procedures for setting the tread removal shape on one side of the tire 10 in the tire width direction with respect to the equatorial plane CL are described below, but the tread removal shape is also set by similar procedures on the other side of the tire 10 in the tire width direction with respect to the equatorial plane CL.

First, when a plurality of grooves 17 is provided on the tread surface 13A, the groove 17 to be evaluated in the performance test using the test tire are determined in advance.

Next, the tire 10 is mounted on an applicable rim 20 and filled to the prescribed internal pressure. The outline of the tread surface 13A in a cross-sectional view perpendicular to a circumferential direction (tire widthwise cross-sectional view) of the tire 10 in this state is acquired.

The aforementioned outline of the tread surface 13A can be acquired by, for example, scanning the tread surface 13A using a measurement apparatus such as a laser scanner. The outline may also be obtained with other methods, such as from a drawing of the tire 10.

Figure 2:
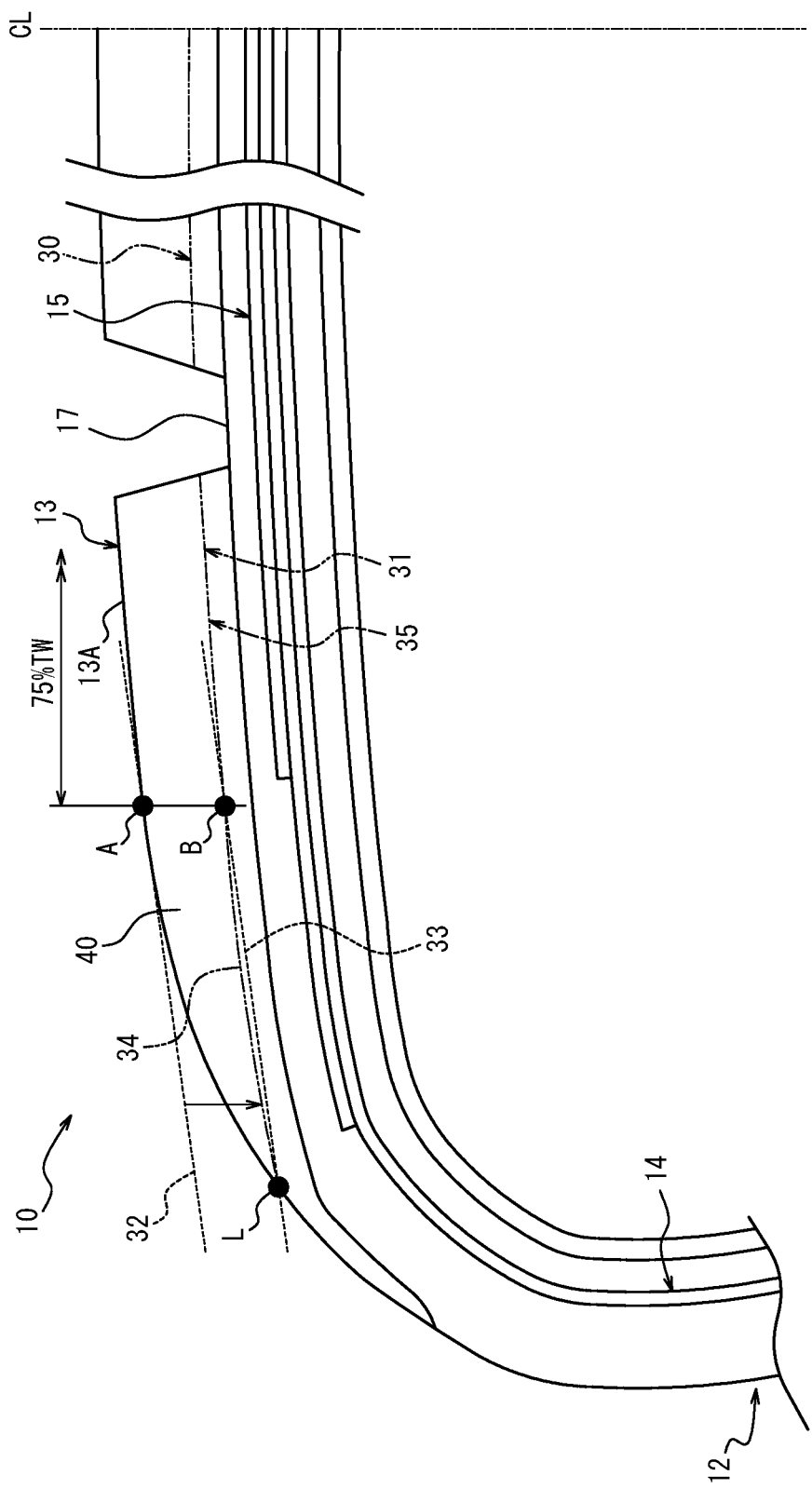
FIG. 2 illustrates the procedure for setting a tread removal shape by the method of setting a tread removal shape according to an embodiment of the present disclosure.

Next, as illustrated in FIG. 2, a remaining groove outline 30 is set by moving the acquired outline of the tread surface 13A inward in the radial direction to the position at which the groove 17 to be evaluated in the performance test has a predetermined depth in the cross-sectional view perpendicular to the circumferential direction of the tire 10.

The remaining depth of the groove 17 to be evaluated, which is the reference for setting the remaining groove outline 30, can be set to 2.0 mm, for example. The depth can be set to any value, however, depending on the content, conditions, and the like of the performance test.

Next, a point A is set on the tread surface 13A at a position corresponding to 70% to 80% of the tread width in the cross-sectional view perpendicular to the circumferential direction of the tire 10. This point A is an imaginary point.

The point A is preferably set on the tread surface 13A at a position corresponding to 75% of the tread width, but the position of the point A can be changed as long as the position on the tread surface 13A corresponds to 70% to 80% of the tread width.

Next, a point B is set at the intersection of a line segment extending from point A in the tire radial direction (a perpendicular line passing through point A) and the remaining groove outline 30 in the cross-sectional view perpendicular to the circumferential direction of the tire 10. This point B is also an imaginary point.

The portion of the remaining groove outline 30 that is farther inward in the tire width direction than the point B, i.e., the portion between the point B and the equatorial plane CL, is then set as a first removal reference line 31.

Next, in the cross-sectional view perpendicular to the circumferential direction of the tire 10, a tangent 32 to the tread surface 13A is drawn at the point A. A point at which a straight line 33 yielded by the tangent 32 being translated to a position passing through the point B (a straight line passing through the point B in parallel with the tangent 32) intersects the outer surface of the tire 10 outward in the tire width direction is set as a point L. This point L is also an imaginary point. The outer surface of the tire 10 outward in the tire width direction, where the point L is set, is the outer surface of the tire 10 that is farther outward in the tire width direction than the point A relative to the equatorial plane CL.

Next, a line passing through the point B and the point L is set as a second removal reference line 34.

The second removal reference line 34 is preferably a curve that passes through the point B and the point L and smoothly contacts the first removal reference line 31 but may, for example, be a straight line that passes through the point B and the point L.

Next, the shape defined by the first removal reference line 31 and the second removal reference line 34 (the cross-sectional shape of the tread 13) is set as a tread removal shape 35.

In this way, the tread removal shape 35 can be set by the method of setting a tread removal shape according to an embodiment of the present disclosure.

Once the tread removal shape 35 has been set, a portion of the tread 13, i.e., a portion for removal 40 of the tread 13 farther outward in the tire than the tread removal shape 35, is then removed over the entire circumference of the tire 10 with reference to the tread removal shape 35 to manufacture a test tire 50. As illustrated in FIG. 1, the portion for removal 40 is located on both sides of the equatorial plane CL of the tire 10, and the portions for removal 40 of the tread 13 is removed on both sides of the equatorial plane CL.

The removal of the tread 13 may be accomplished by cutting using a cutting tool such as a tool bit, by grinding using a grinding tool such as a grinder, or by other means. The removal of the tread 13 may be accomplished by using an apparatus such as a cutting apparatus or grinding apparatus, for example a buffing device, or by another method, such as by hand. Furthermore, the removal of the tread 13 may be accomplished by first removing most of the portion for removal 40 of the tread 13 by cutting and then performing a finishing process while using a grinder or the like to remove the remaining portion by grinding.

Figure 3:
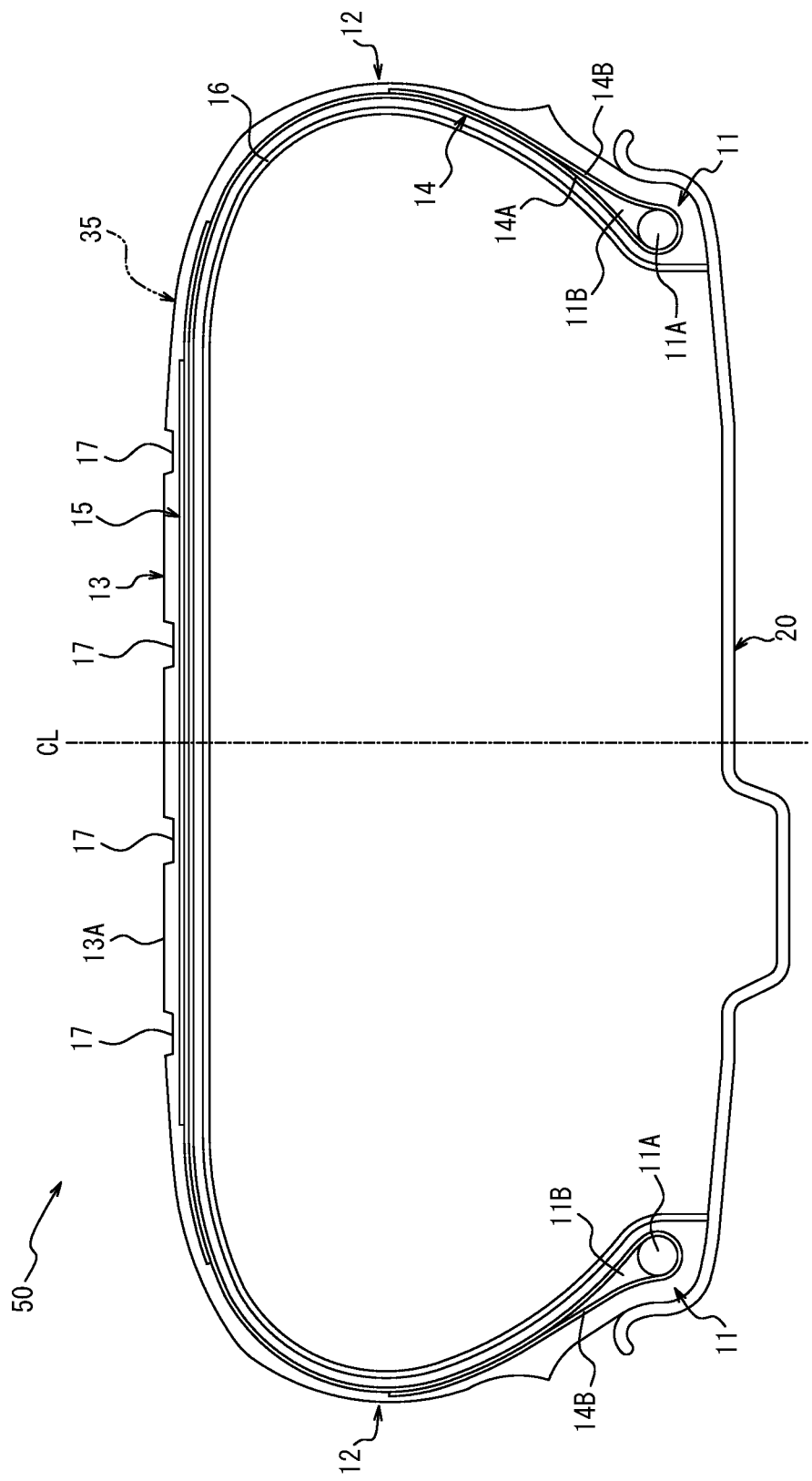
FIG. 3 is a cross-sectional view, perpendicular to the tire circumferential direction, of a test tire manufactured by the method of manufacturing a test tire according to an embodiment of the present disclosure.

In this way, the portion for removal 40, which is farther outward in the tire than the tread removal shape 35, of the tread 13 of the tire 10 is removed by cutting or grinding over the entire circumference of the tire 10. The test tire 50 with an outline along the tread removal shape 35, as illustrated in FIG. 3, can thereby be manufactured.

In the test tire 50, the tread surface 13A has an outline along the tread removal shape 35 over the entire circumference in the tire circumferential direction.

According to the method of manufacturing a test tire of the present disclosure, when a portion of the tread 13 of the tire 10 is removed to manufacture the test tire 50, the cross-sectional shape to be removed from the tire 10 can be clearly specified as the tread removal shape 35, and by removing a portion of the tread 13 of the tire 10 with reference to the tread removal shape 35, the test tire 50 that reproduces the worn state well can easily be manufactured.

According to the method of manufacturing a test tire of the present disclosure, excessive removal of the portion of the tread 13 on the shoulder side can be prevented in tires 10 of various tire sizes. This enables the manufacturing of test tires 50 with improved reproducibility of the worn state from tires 10 of various tire sizes, without exposing the carcass 14 or belt 15, which are internal structures of the tires 10.

Furthermore, at the portion of the tire 10 on the shoulder side, the tread 13 can be provided with a shape having high reproducibility with respect to the worn state that occurs during actual road driving.

Therefore, the test tire 50 can be considered a good reproduction of the worn state of the tire 10, and the performance of the tire 10 in the worn state can be reproduced well by a performance test using the test tire 50.

According to the method of setting a tread removal shape of the present disclosure, the tread removal shape 35 can easily be set, from the tire 10 that includes the grooves 17 on the tread surface 13A, to enable the manufacture of a test tire 50 that reproduces the worn state well. Therefore, the test tire 50 that reproduces the worn state well can easily be manufactured.

According to the method of manufacturing a test tire and the method of setting a tread removal shape of the present disclosure, the second removal reference line 34 is a curve that passes through the point B and the point L and smoothly contacts the first removal reference line 31. The test tire 50 can therefore reproduce the worn state of the tire 10 even better.

Furthermore, according to the method of manufacturing a test tire and the method of setting a tread removal shape of the present disclosure, the point A is set at a position on the tread surface 13A corresponding to 75% of the tread width. The test tire 50 can therefore reproduce the worn state of the tire 10 even better.

In the case in which the tread surface 13A is finished by grinding using a grinder or the like after a portion of the tread 13 of the tire 10 is removed by cutting, the surface roughness Ra of the tread surface 13A is set to Ra≤40 μm, preferably Ra≤20 μm.

In this way, the tread surface 13A of the manufactured test tire 50 can be provided with the same surface roughness as that of the tread surface of a tire worn by driving on a real road, further improving the reproducibility of the worn state of the test tire 50.

While embodiments of the present disclosure have been described above, the present disclosure is in no way limited to the above embodiments.

For example, in the above embodiments, the tire 10 has been described as a passenger car radial tire, but this example is not limiting. The tire may be used in a variety of vehicles, such as light trucks, buses, motorcycles, tractors and other agricultural vehicles, dump trucks and other construction or building vehicles, and electric bicycles.

In the above embodiment, the tire 10 has been described as being a tubeless tire provided with an inner liner, but this configuration is not limiting. The tire 10 may, for example, be a tube-type tire equipped with a tube.

For example, the tire in the present disclosure can also be a non-pneumatic tire.

REFERENCE SIGNS LIST

10 Tire
11 Bead
11A Bead core
11B Bead filler
12 Sidewall
13 Tread
13A Tread surface
14 Carcass
15 Belt
16 Inner liner
17 Groove
20 Applicable rim
30 Remaining groove outline
31 First removal reference line
32 Tangent
33 Straight line
34 Second removal reference line
35 Tread removal shape
40 Portion for removal
50 Test tire
CL Equatorial plane
A Point
B Point
L Point

The invention claimed is:

1. A method of manufacturing a test tire that reproduces a worn state by removal of a portion of a tread of a tire including a groove on a tread surface, the method comprising:

in a cross-sectional view perpendicular to a circumferential direction of the tire when the tire is mounted on an applicable rim and filled to a prescribed internal pressure, moving an outline of the tread surface inward in a radial direction to a position at which the groove has a predetermined depth to set a remaining groove outline;

setting a point A on the tread surface at a position corresponding to 70% to 80% of a tread width and setting a point B at an intersection of a line segment extending from the point A in the radial direction of the tire with the remaining groove outline;

setting a portion of the remaining groove outline that is farther inward in a tire width direction than the point B as a first removal reference line;

setting a point at which a straight line, yielded by a tangent to the tread surface at the point A being translated to the point B, intersects an outer surface of the tire outward in the tire width direction as a point L;

setting a line passing through the point B and the point L as a second removal reference line; and removing a portion of the tread, with reference to a tread removal shape defined by the first removal reference line and the second removal reference line, to manufacture the test tire.

2. The method of manufacturing a test tire of claim 1, wherein the second removal reference line is a curve that passes through the point B and the point L and smoothly contacts the first removal reference line.

3. The method of manufacturing a test tire of claim 1, wherein the point A is set on the tread surface at a position corresponding to 75% of the tread width.

4. The method of manufacturing a test tire of claim 1, wherein the second removal reference line is a curve that passes through the point B and the point L and smoothly contacts the first removal reference line, and wherein the point A is set on the tread surface at a position corresponding to 75% of the tread width.

5. A method of setting a tread removal shape serving as a reference for removing a tread when manufacturing a test tire that reproduces a worn state by removal of a portion of the tread of a tire that includes a groove on a tread surface, the method comprising:

in a cross-sectional view perpendicular to a circumferential direction of the tire when the tire is mounted on an applicable rim and filled to a prescribed internal pressure, moving an outline of the tread surface inward in a radial direction to a position at which the groove has a predetermined depth to set a remaining groove outline;

setting a point A on the tread surface at a position corresponding to 70% to 80% of a tread width and setting a point B at an intersection of a line segment extending from the point A in the radial direction of the tire with the remaining groove outline;

setting a portion of the remaining groove outline that is farther inward in a tire width direction than the point B as a first removal reference line;

setting a point at which a straight line, yielded by a tangent to the tread surface at the point A being translated to the point B, intersects an outer surface of the tire outward in the tire width direction as a point L;

setting a line passing through the point B and the point L as a second removal reference line; and setting a shape defined by the first removal reference line and the second removal reference line as the tread removal shape.

6. The method of setting a tread removal shape of claim 5, wherein the second removal reference line is a curve that passes through the point B and the point L and smoothly contacts the first removal reference line.

7. The method of setting a tread removal shape of claim 5, wherein the point A is set on the tread surface at a position corresponding to 75% of the tread width.

8. The method of setting a tread removal shape of claim 5, wherein the second removal reference line is a curve that passes through the point B and the point L and smoothly contacts the first removal reference line and wherein the point A is set on the tread surface at a position corresponding to 75% of the tread width.

* * * * *